(12) United States Patent
Hickling

(10) Patent No.: US 9,573,573 B1
(45) Date of Patent: Feb. 21, 2017

(54) ERRANT VEHICLE INTERDICTION DEVICE

(71) Applicant: Michael Hickling, Carmi, IL (US)

(72) Inventor: Michael Hickling, Carmi, IL (US)

(*) Notice: Subject to any disclaimer, the term of this patent is extended or adjusted under 35 U.S.C. 154(b) by 0 days.

(21) Appl. No.: 14/974,641

(22) Filed: Dec. 18, 2015

(51) Int. Cl.
*B60T 7/18* (2006.01)
*H02J 7/35* (2006.01)
*B60K 28/10* (2006.01)
*F02D 41/04* (2006.01)
*H04L 29/08* (2006.01)

(52) U.S. Cl.
CPC ........... *B60T 7/18* (2013.01); *B60K 28/10* (2013.01); *F02D 41/042* (2013.01); *H02J 7/35* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 3,112,004 A | | 11/1963 | Neaville | |
| 3,559,756 A | | 2/1971 | Torres | |
| 4,706,072 A | * | 11/1987 | Ikeyama | B60K 28/063 340/575 |
| 5,203,422 A | | 4/1993 | Estep | |
| 5,307,048 A | * | 4/1994 | Sonders | B60R 25/04 180/287 |
| 5,417,090 A | * | 5/1995 | Baumann | D04B 35/32 15/312.1 |
| 5,453,730 A | * | 9/1995 | De-Grinis | B60R 25/04 307/10.3 |
| 5,477,090 A | * | 12/1995 | Davis | B60R 25/04 180/287 |
| 5,486,806 A | * | 1/1996 | Firar | B60R 25/042 180/284 |
| 5,506,562 A | * | 4/1996 | Wiesner | B60R 25/04 180/287 |
| 5,563,453 A | * | 10/1996 | Nyfelt | B60R 25/04 180/287 |
| 5,608,272 A | * | 3/1997 | Tanguay | B60R 25/04 180/287 |
| 5,623,245 A | * | 4/1997 | Gilmore | B60R 25/04 307/10.2 |
| 5,652,564 A | * | 7/1997 | Winbush | B60R 25/04 307/10.3 |
| 5,729,192 A | * | 3/1998 | Badger | B60R 25/04 307/10.2 |
| 5,832,395 A | * | 11/1998 | Takeda | B60L 11/1803 701/22 |
| 6,072,248 A | * | 6/2000 | Muise | B60R 25/04 180/287 |

(Continued)

*Primary Examiner* — Russell Frejd

(57) ABSTRACT

An errant vehicle interdiction device for stopping errant vehicles includes a transmitting unit that is line-of-sight limited. The transmitting unit emits a brake command and an engine off command. The device comprises a receiving unit that is coupled to a vehicle. The receiving unit is operationally coupled to the central processing unit of the vehicle. The receiving unit is positioned to receive the brake command and the engine off command from the transmitting unit. The receiving unit relays the commands to the central processing unit of the vehicle. The central processing unit of the vehicle issues the brake command to the braking system of the vehicle and the engine off command to the engine of the vehicle, bringing the errant vehicle to a stop.

13 Claims, 5 Drawing Sheets

(56) References Cited

U.S. PATENT DOCUMENTS

| | | | | |
|---|---|---|---|---|
| 6,129,025 | A * | 10/2000 | Minakami | B60L 5/005 |
| | | | | 104/288 |
| 6,313,791 | B1 * | 11/2001 | Klanke | B60R 25/018 |
| | | | | 342/357.75 |
| 6,349,253 | B1 * | 2/2002 | Bellinger | B60W 10/06 |
| | | | | 477/115 |
| 6,370,475 | B1 * | 4/2002 | Breed | B60Q 9/008 |
| | | | | 340/436 |
| 6,819,995 | B2 * | 11/2004 | Bellinger | B60W 10/06 |
| | | | | 477/124 |
| 6,923,509 | B1 | 8/2005 | Barnett | |
| 8,265,987 | B2 | 9/2012 | Goto | |
| 8,562,244 | B2 * | 10/2013 | D'Almeida | E01F 13/105 |
| | | | | 404/6 |
| 9,024,787 | B2 | 5/2015 | Alshinnawi | |
| 9,105,188 | B2 * | 8/2015 | Alshinnawi | G08G 1/096783 |
| 2003/0052532 | A1 | 3/2003 | Costello | |
| 2014/0309934 | A1 * | 10/2014 | Ricci | H04W 48/04 |
| | | | | 701/537 |
| 2015/0107553 | A1 * | 4/2015 | Bartkowicz | F02D 13/04 |
| | | | | 123/323 |
| 2016/0082839 | A1 * | 3/2016 | Ricci | H04W 48/04 |
| | | | | 701/36 |
| 2016/0123242 | A1 * | 5/2016 | Hamilton | F02D 41/12 |
| | | | | 123/324 |
| 2016/0217687 | A1 * | 7/2016 | Rous | G08G 1/056 |

* cited by examiner

ERRANT VEHICLE INTERDICTION DEVICE

BACKGROUND OF THE DISCLOSURE

Field of the Disclosure

The disclosure relates to interdiction devices and more particularly pertains to a new interdiction device for stopping errant vehicles.

SUMMARY OF THE DISCLOSURE

An embodiment of the disclosure meets the needs presented above by generally comprising a transmitting unit that is line-of-sight limited. The transmitting unit emits a brake command and an engine off command. The device comprises a receiving unit that is coupled to a vehicle. The receiving unit is operationally coupled to the central processing unit of the vehicle. The receiving unit is positioned to receive the brake command and the engine off command from the transmitting unit. The receiving unit relays the commands to the central processing unit of the vehicle. The central processing unit of the vehicle issues the brake command to the braking system of the vehicle and the engine off command to the engine of the vehicle, bringing the errant vehicle to a stop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
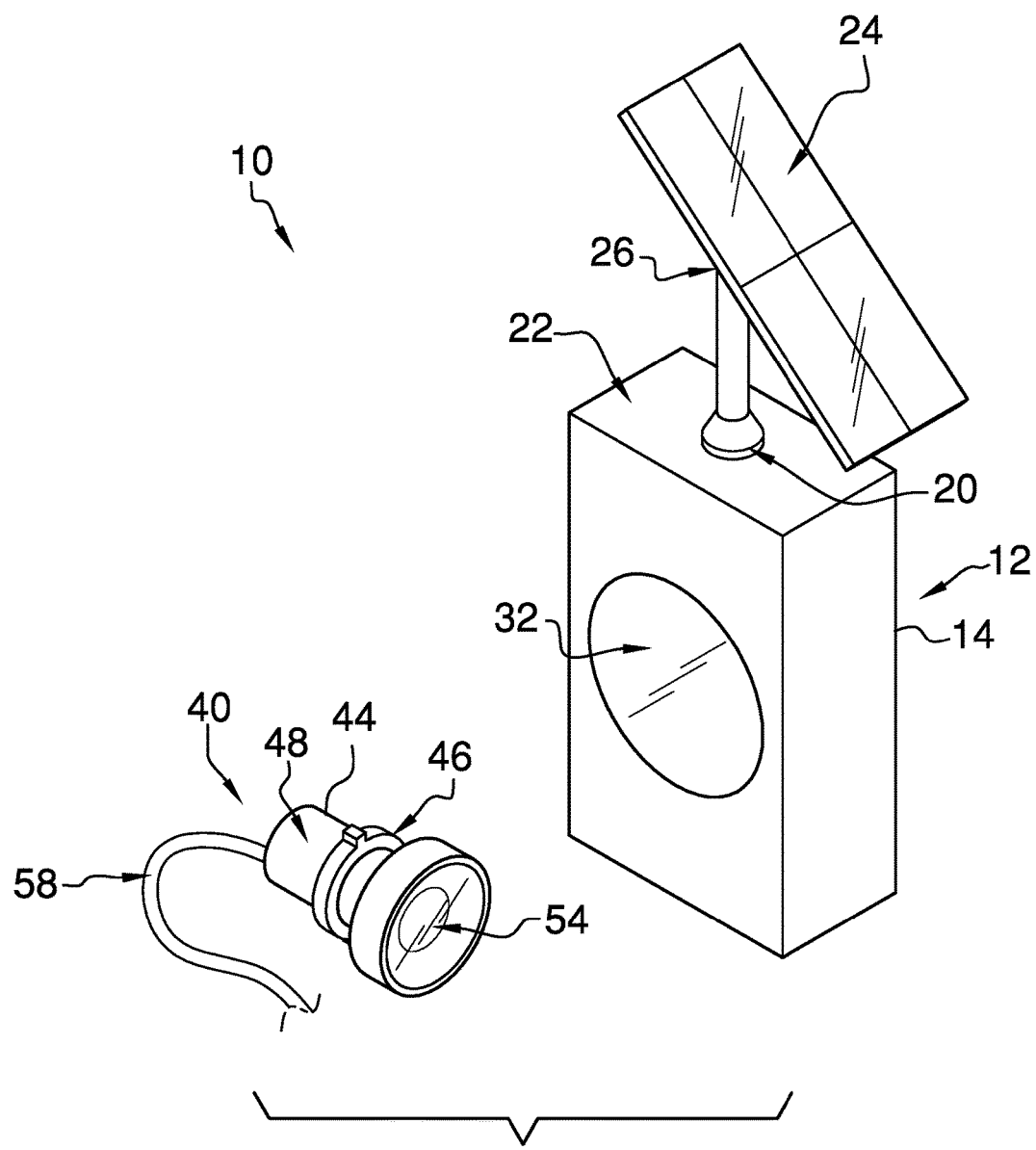
FIG. 1 is an isometric perspective view of an errant vehicle interdiction device according to an embodiment of the disclosure.
Figure 2:
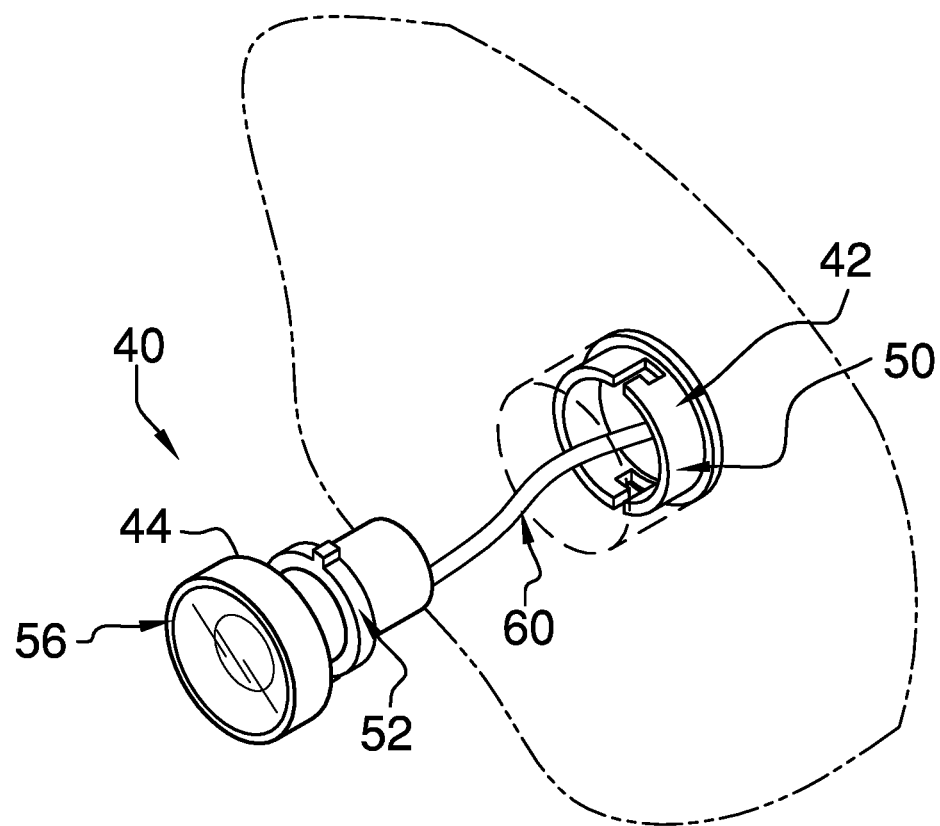
FIG. 2 is an isometric perspective view of an embodiment of the disclosure.
Figure 3:
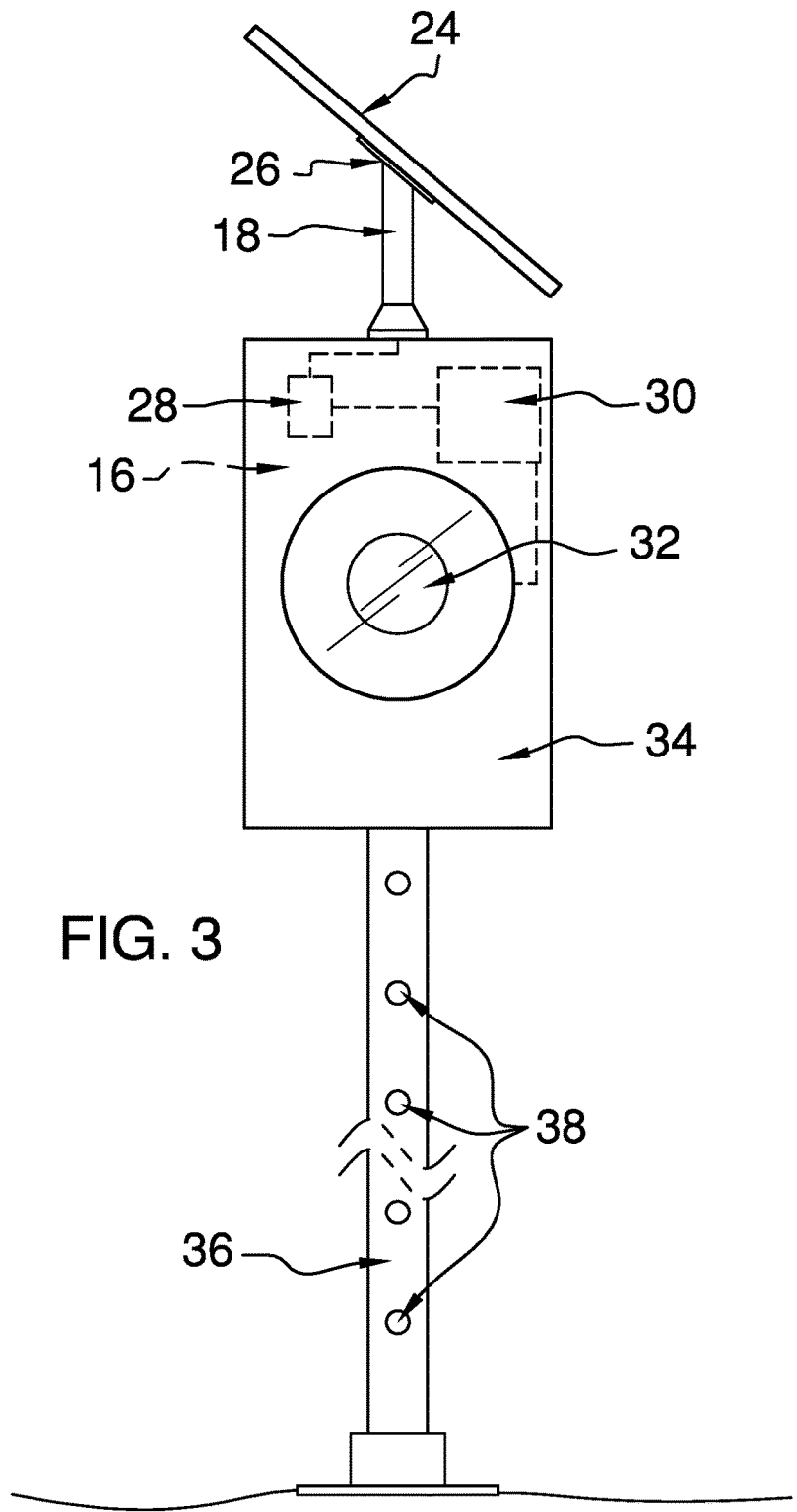
FIG. 3 is a front view of an embodiment of the disclosure.
Figure 4:
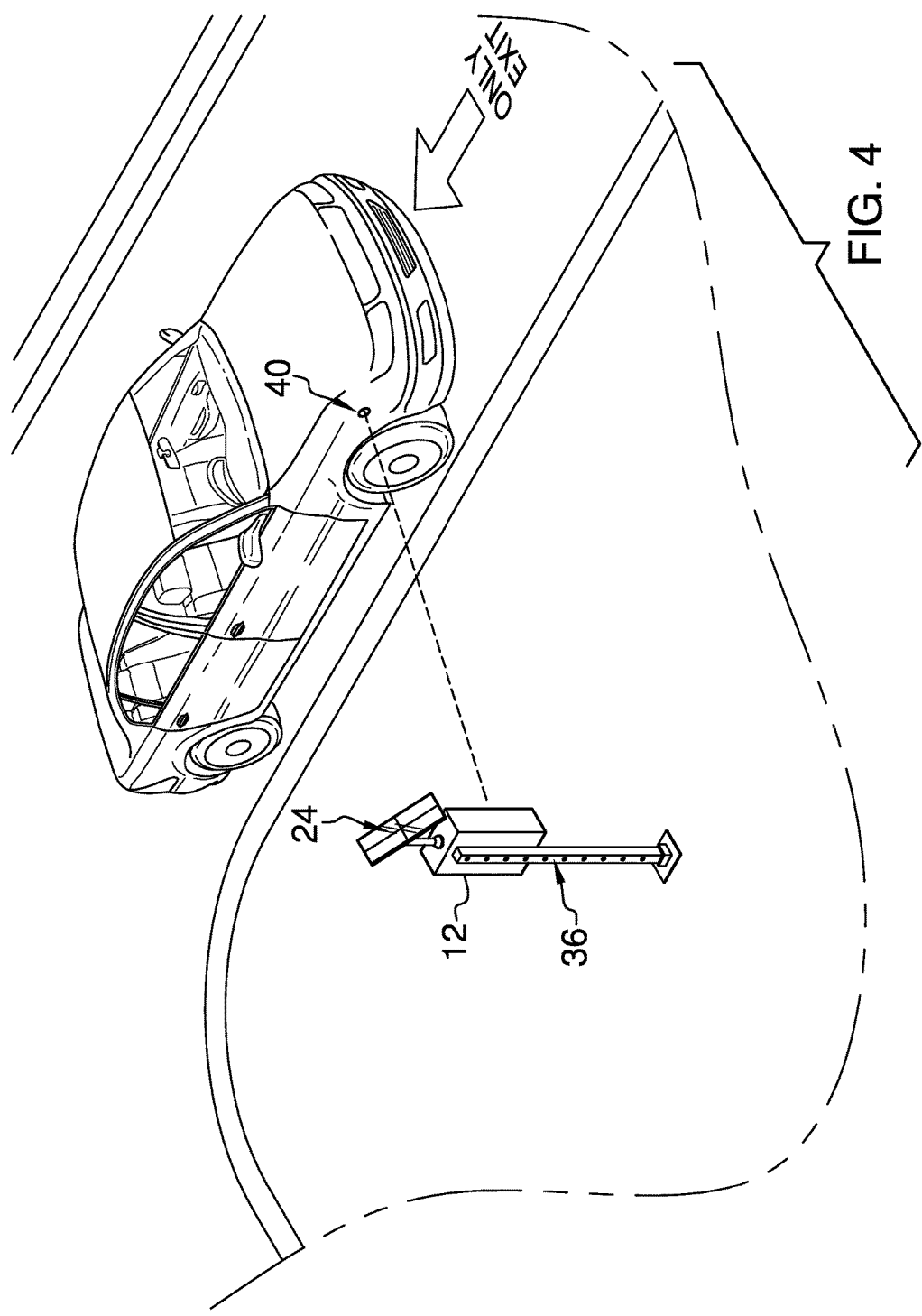
FIG. 4 is an in-use view of an embodiment of the disclosure.
Figure 5:
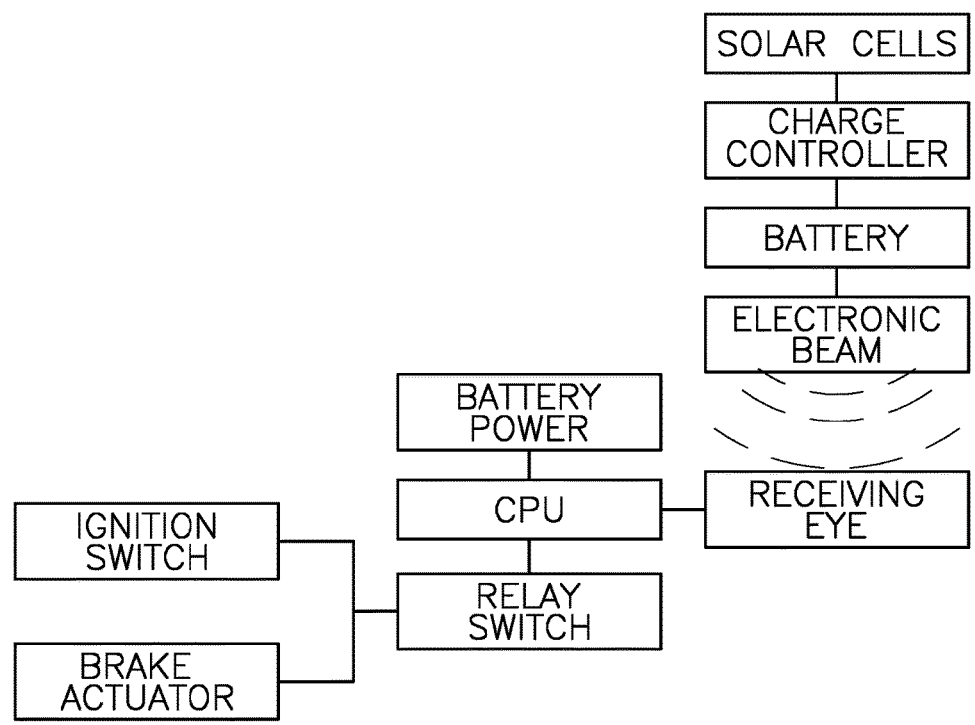
FIG. 5 is a block diagram of an embodiment of the disclosure.

With reference now to the drawings, and in particular to FIGS. 1 through 5 thereof, a new interdiction device embodying the principles and concepts of an embodiment of the disclosure and generally designated by the reference numeral 10 will be described.

As best illustrated in FIGS. 1 through 5, the errant vehicle interdiction device 10 generally comprises a transmitting unit 12 that is line-of-sight limited. The transmitting unit 12 emits a brake command and an engine off command. Preferably, the transmitting unit 12 is solar powered.

More specifically, the transmitting unit 12 comprises a first housing 14 that defines an internal space 16. The first housing 14 is substantially rectangularly box shaped. A post 18 is coupled by a first terminus 20 to a top 22 of the first housing 14. The post 18 is circular when viewed longitudinally. A solar panel 24 is coupled to a second terminus 26 of the post 18. The solar panel 24 is positionable to harvest solar energy. A charge controller 28 is positioned in and coupled to the first housing 14. The charge controller 28 is operationally coupled to the solar panel 24. A battery 30 is positioned in and coupled to the first housing 14. The battery 30 is operationally coupled to the charge controller 28. The charge controller 28 is positioned to control the charge level of the battery 30. An emitter 32 is coupled to the first housing 14 and positioned through a front wall 34 of the first housing 14. The emitter 32 is operationally coupled to the battery 30. The emitter 32 is positioned in the first housing 14 such that a brake command and an engine off command are emitted from the front wall 34 of the first housing 14. In one embodiment of the invention, the transmitting unit 12 is configured to be handheld. Another embodiment of the invention comprises a pole 36 that is couplable to the first housing 14. The pole 36 is configured to secure the first housing 14 in a roadside position. The pole 36 has a plurality of mounting holes 38, such that the first housing 14 is couplable to the pole 36 at variable heights.

The device 10 includes a receiving unit 40 that is coupled to a vehicle. The receiving unit 40 is operationally coupled to the central processing unit of the vehicle. More specifically, the receiving unit 40 comprises a first coupler 42 that is complimentary to a penetration positioned in a vehicle. The first coupler 42 is positioned on an interior wall of the vehicle. Preferably, the first coupler 42 is positioned on the passenger side of the vehicle proximate to the front of the vehicle. A second housing 44 that is complimentary to the penetration in the vehicle is insertable into the penetration. The second housing 44 is substantially circular when viewed longitudinally. A second coupler 46 is coupled to an exterior 48 of the second housing 44. The second coupler 46 is complimentary to the first coupler 42 and positioned to couple with the first coupler 42 to couple the second housing 44 to the vehicle. Preferably, the first coupler 42 comprises a female locking ring 50 and the second coupler 46 comprises a male locking ring 42. A detector 54 is coupled to and positioned in the second housing 44. The detector 54 is positioned through a side wall 56 of the second housing 44. A relay 58 is operationally coupled to the detector 54 and a computer processing unit of the vehicle. Preferably, the relay 58 comprises wiring 60.

In use, the pole 36 is configured to install at a roadside location and positioned to mount the first housing 14. The emitter 32 is positioned to emit a brake command and an engine off command to passing vehicles. The detector 54 is positioned in the second housing 44 to receive the brake command and the engine off command emitted by the emitter 32. The relay 58 is positioned to relay the brake command and the engine off command to the computer processing unit of the vehicle. The computer processing unit of the vehicle issues the brake command to the braking system of the vehicle and the engine off command to the engine of the vehicle, bringing the errant vehicle to a stop. Preferably, the transmitting unit 12 is positioned on the side of a roadway where a receiving unit 40 positioned on the passenger side of the vehicle will be in the line-of-sight of the transmitting unit 12 if the vehicle is traveling in the wrong direction. In this configuration, the errant vehicle will be stopped. Vehicles with a receiving unit 40 traveling in the correct direction would not be stopped as the receiving unit 40 would not receive the brake command and engine off command from the transmitting unit 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An errant vehicle interdiction device comprising:
   a transmitting unit, said transmitting unit being line-of-sight limited, wherein said transmitting unit emits a brake command and an engine off command;
   a receiving unit, said receiving unit being coupled to a vehicle, said receiving unit being operationally coupled to the central processing unit of the vehicle; and
   wherein said receiving unit is positioned to receive the brake command and the engine off command from said transmitting unit, wherein said receiving unit relays the commands to the central processing unit of the vehicle, such that the brake command is issued to the braking system of the vehicle and the engine off command is issued to the engine of the vehicle.

2. The device of claim 1, further including said transmitting unit being solar powered.

3. The device of claim 1, further including said transmitting unit comprising:
   a first housing, said first housing defining an internal space;
   a post, said post being coupled by a first terminus to a top of said first housing;
   a solar panel, said solar panel being coupled to a second terminus of said post, such that said solar panel is positionable for harvesting solar energy;
   a charge controller, said charge controller being positioned in and coupled to said first housing, said charge controller being operationally coupled to said solar panel;
   a battery, said battery being positioned in and coupled to said first housing, said battery being operationally coupled to said charge controller, wherein said charge controller is positioned to control the charge level of said battery; and
   an emitter, said emitter being coupled to said first housing and positioned through a front wall of said first housing, said emitter being operationally coupled to said battery, where said emitter is positioned in said first housing such that a brake command and an engine off command are emitted from the front wall of said first housing.

4. The device of claim 3, further including said first housing being substantially rectangularly box shaped.

5. The device of claim 3, further including said post being circular when viewed longitudinally.

6. The device of claim 3, further including a pole, said pole being couplable to said first housing, said pole being configured to secure said first housing in a roadside position, wherein said pole is configured for installation at a roadside location and positioned for mounting of said first housing, such that said emitter is positioned to emit a brake command and an engine off command to passing vehicles.

7. The device of claim 6, further including said pole having a plurality of mounting holes, such that said first housing is couplable to said pole at variable heights.

8. The device of claim 1, further including said receiving unit comprising:
   a first coupler, said first coupler being complimentary to a penetration positioned in a vehicle, said first coupler being positioned on an interior wall of the vehicle;
   a second housing, said second housing being complimentary to the penetration in the vehicle, such that said second housing is insertable into the penetration;
   a second coupler, said second coupler being coupled to an exterior of said second housing, said second coupler being complementary to said first coupler, wherein said second coupler is positioned to couple with said first coupler to couple said second housing to the vehicle;
   a detector, said detector being coupled to and positioned in said second housing, said detector being positioned through a side wall of said second housing;
   a relay, said relay being operationally coupled to said detector and a computer processing unit of the vehicle; and
   wherein said detector is positioned in said second housing to receive the brake command and the engine off command emitted by said transmitting unit, wherein said relay is positioned to relay the brake command and the engine off command to the computer processing unit of the vehicle.

9. The device of claim 8, further including said first coupler being positioned on the passenger side of the vehicle, said first coupler being positioned proximate to the front of the vehicle.

10. The device of claim 8, further including said second housing being substantially circular when viewed longitudinally.

11. The device of claim 8, further including said relay comprising wiring.

12. The device of claim 8, further comprising:
    said first coupler comprising a female locking ring; and
    said second coupler comprising a male locking ring.

13. An errant vehicle interdiction device comprising:
    a transmitting unit, said transmitting unit being line-of-sight limited, wherein said transmitting unit emits a brake command and an engine off command;
    said transmitting unit being solar powered;
    said transmitting unit comprising:
    a first housing, said first housing defining an internal space, said first housing being substantially rectangularly box shaped,
    a post, said post being coupled by a first terminus to a top of said first housing, said post being circular when viewed longitudinally, a solar panel, said solar panel being coupled to a second terminus of said post, such that said solar panel is positionable for harvesting solar energy, a charge controller, said charge controller being positioned in and coupled to said first housing, said charge controller being operationally coupled to said solar panel, a battery, said battery being positioned in and coupled to said first housing, said battery being operationally coupled to said charge controller, wherein said charge controller is positioned to control the charge level of said battery, an emitter, said emitter being coupled to said first housing and positioned through a front wall of said first housing, said emitter being operationally coupled to said battery, where said emitter is positioned in said first housing such that a brake command and an engine off command are emitted from the front wall of said first housing, a pole, said pole being couplable to said first housing, said pole being configured to secure said first housing in a roadside position, said pole having a plurality of mounting holes, such that said first housing is couplable to said pole at variable heights, and wherein said pole is configured for installation at a roadside location and positioned for mounting of said first housing, such that said emitter is positioned to emit a brake command and an engine off command to passing vehicles;

a receiving unit, said receiving unit being coupled to a vehicle, said receiving unit being operationally coupled to the central processing unit of the vehicle;

said receiving unit comprising:

a first coupler, said first coupler being complimentary to a penetration positioned in a vehicle, said first coupler being positioned on an interior wall of the vehicle, said first coupler being positioned on the passenger side of the vehicle, said first coupler being positioned proximate to the front of the vehicle, a second housing, said second housing being complimentary to the penetration in the vehicle, such that said second housing is insertable into the penetration, said second housing being substantially circular when viewed longitudinally, a second coupler, said second coupler being coupled to an exterior of said second housing, said second coupler being complementary to said first coupler, wherein said second coupler is positioned to couple with said first coupler to couple said second housing to the vehicle, said first coupler comprising a female locking ring, said second coupler comprising a male locking ring, a detector, said detector being coupled to and positioned in said second housing, said detector being positioned through a side wall of said second housing, a relay, said relay being operationally coupled to said detector and a computer processing unit of the vehicle, said relay comprising wiring, and wherein said detector is positioned in said second housing to receive the brake command and the engine off command emitted by said emitter, wherein said relay is positioned to relay the brake command and the engine off command to the computer processing unit of the vehicle; and wherein said receiving unit is positioned to receive the brake command and the engine off command from said transmitting unit, wherein said receiving unit relays the commands to the central processing unit of the vehicle, such that the brake command is issued to the braking system of the vehicle and the engine off command is issued to the engine of the vehicle.

* * * * *